United States Patent
Hanna

(10) Patent No.: US 9,441,606 B2
(45) Date of Patent: Sep. 13, 2016

(54) SYNERGIC METHOD FOR HYDRODYNAMIC ENERGY GENERATION WITH NEUTRALIZED HEAD PRESSURE PUMP

(71) Applicant: Ibrahim Hanna, Miami, FL (US)

(72) Inventor: Ibrahim Hanna, Miami, FL (US)

( * ) Notice: Subject to any disclaimer, the term of this patent is extended or adjusted under 35 U.S.C. 154(b) by 0 days.

(21) Appl. No.: 14/993,945

(22) Filed: Jan. 12, 2016

(65) Prior Publication Data

US 2016/0123296 A1    May 5, 2016

Related U.S. Application Data

(63) Continuation-in-part of application No. 14/733,951, filed on Jun. 8, 2015, now Pat. No. 9,234,437, which is a continuation of application No. 14/515,101, filed on Oct. 15, 2014, now Pat. No. 9,051,914, which is a continuation-in-part of application No. 14/258,716, filed on Apr. 22, 2014, now abandoned, which is a continuation of application No. 14/195,133, filed on Mar. 3, 2014, now abandoned.

(60) Provisional application No. 61/925,828, filed on Jan. 10, 2014.

(51) Int. Cl.
| | |
|---|---|
| *F03B 13/10* | (2006.01) |
| *F03B 13/06* | (2006.01) |
| *F03B 15/14* | (2006.01) |
| *F03B 17/02* | (2006.01) |
| *F03B 17/00* | (2006.01) |

(52) U.S. Cl.
CPC ............... *F03B 13/10* (2013.01); *F03B 13/06* (2013.01); *F03B 15/14* (2013.01); *F03B 17/02* (2013.01); *F03B 17/005* (2013.01); *Y10S 415/916* (2013.01)

(58) Field of Classification Search
CPC ...... H02K 7/1823; H02K 7/18; Y02E 10/22; Y02E 10/28
USPC ......................................... 290/52, 53
See application file for complete search history.

(56) References Cited

U.S. PATENT DOCUMENTS

| | | | | |
|---|---|---|---|---|
| 4,382,365 | A * | 5/1983 | Kira | F03G 3/00 60/641.11 |
| 4,698,516 | A * | 10/1987 | Thompson | F03B 13/06 290/54 |
| 6,420,794 | B1 * | 7/2002 | Cao | F03B 17/005 290/43 |
| 7,329,962 | B2 * | 2/2008 | Alstot | F03B 13/00 290/43 |

(Continued)

*Primary Examiner* — Tulsidas C Patel
*Assistant Examiner* — Sean Gugger
(74) *Attorney, Agent, or Firm* — Mark Terry

(57) ABSTRACT

A synergic method for hydrodynamic energy generation includes providing a system and method utilization for producing electrical power or mechanical rotational pumping energy for pumping water to high level reservoir or to feeding a decorative water fall, providing a multi compartment housing, pumping water via the housing, providing a first vertically aligned compartment within or beside the housing, mechanically coupling a first water wheel, situated at the bottom of first compartment, to pump shaft, generating by the first wheel mechanical rotational power, providing a second vertically aligned compartment mechanically coupling a second water wheel to a generator, generating electrical or mechanical rotational power, by the generator, providing a third vertically aligned compartment providing a fourth compartment, a pump or external jet for removing water from the fourth compartment, utilizing energy and conductively coupling the hydrodynamic energy generation system with the external power source via a coupling.

24 Claims, 12 Drawing Sheets

(56) References Cited

U.S. PATENT DOCUMENTS

| | | | |
|---|---|---|---|
| 8,127,542 B1 * | 3/2012 | Dolcimascolo | F03B 13/06 60/398 |
| 8,400,007 B2 * | 3/2013 | Campbell | F03B 13/06 290/54 |
| 2010/0253080 A1 * | 10/2010 | DeAngeles | F03B 13/06 290/52 |
| 2011/0260460 A1 * | 10/2011 | Rovinsky | F03B 13/10 290/54 |
| 2012/0074703 A1 * | 3/2012 | Lin | F03B 7/00 290/54 |
| 2012/0187692 A1 * | 7/2012 | Walton | F03B 13/08 290/54 |

* cited by examiner

US 9,441,606 B2

SYNERGIC METHOD FOR HYDRODYNAMIC ENERGY GENERATION WITH NEUTRALIZED HEAD PRESSURE PUMP

CROSS-REFERENCE TO RELATED APPLICATIONS

This patent application is a continuation in part and claims priority to utility patent application Ser. No. 14/733,951 filed Jun. 8, 2015 and entitled "Hydrodynamic Energy Generation System with Neutralized Pump", which is a continuation in part and claims priority to utility patent application Ser. No. 14/515,101 filed Oct. 15, 2014 and entitled "Hydrodynamic Energy Generation System with Dual Fluid Entry System", which is a continuation in part and claims priority to utility patent application Ser. No. 14/258,716 filed Apr. 22, 2014 and entitled "Hydrodynamic Energy Generation System with Energy Recovery and Levering System", which is a continuation in part and claims priority to utility patent application Ser. No. 14/195,133 filed Mar. 3, 2014 and entitled "Hydrodynamic Energy Generation System", which claims priority to provisional patent application No. 61/925,828 filed Jan. 10, 2014 and entitled "Hydrodynamic Energy Generation System." Application Ser. Nos. 14/773,951, 14/515,101, 14/258,716, 14/195,133 and 61/925,828 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to the field of energy production and utilization, and more specifically relates to the field of energy production via hydrodynamic sources.

BACKGROUND OF THE INVENTION

A power generating station is an industrial machine or plant for the generation of mechanical, hydrodynamic or electric power. At the center of nearly all power generating stations is a generator, which typically includes a rotating machine that converts mechanical power into electrical power by creating relative motion between a magnetic field and a conductor. The energy source harnessed to turn the generator varies widely—from moving water and wind, to fossil fuels (such as coal, oil, and natural gas) and nuclear material. In recent times, however, due to the decreasing reserves of fossil fuels and the environmental impact of their use in power generation, cleaner and abundant alternatives for the generation of power have become more popular. One of the cleaner alternatives is hydropower; however, hydropower is limited by size of lakes held in reservoirs or behind dams. Such water has a potential power that, when released, will be delivering energy in a certain form. The standard form utilized nowadays is allowing water flow to rotate a turbine at maximum velocity point of the energy curve of the turbine to generate maximum power. In one theoretical example, in a 200 foot high system, 5 feet diameter Wheel/Turbine, 30" bucket area, at 400 GPM flow we calculated 15 KW theoretically available power, which if deployed to multiple pumps to pumping water back to 200 feet high, at 40% efficiency, we may expect about 160 GPM pumping output. In our method, we utilized same potential energy over same turbine, to directly drive a pump, by utilizing another, higher torque point of the energy curve, at about 10% turbine velocity and 90% of torque (by controlling and lowering flow using a valve under turbine), such method will not change the value of available potential power, but instead will move the point of energy utilization on curve toward maximum torque, minimizing flow to 40 GPM, and also minimizing available power to 1.5 KW, however adding to the shafts additional driving force of about 2600 lbf, (and a torque output energy equivalent to about 4500 ft-lbf) where 1 ft-lbf is enough energy to lift one pound, one foot vertically per second, allowing theoretically to pump about 160 gallons per minute to 200 feet high reservoir, with only 40 GPM down flow, In this alternative method, we have 120 GPM net pumping gain available to be dropped back over second turbine in a 200 feet high housing, to generate what we calculated about 4 KW energy as usual but without depleting the upper reservoir or lake.

With regard to the economy of energy generation, theoretical calculations show that having at least two turbines and a pump in sequence, as per the above-described method, yields similar number of Watts generated per Gallon of flow by the last in series turbine, but without depleting upper reservoir or lake behind a dam. Energy production then is only limited to the number of utilized turbines rather than the size of the lake behind the dam or the size of the upper reservoir. Limits on the amount of energy available from hydrodynamic installations will be eliminated and hydrodynamic energy may cover 100% of our human energy needs. The cost of already cheap but limited hydrodynamic energy production will further decrease when a Dam's potential of energy utilization is increased Hydropower is limited. Hydroelectricity refers to electricity generated by hydropower, i.e., the production of electrical power through the use of the gravitational force of falling water. However, the limited availability of hydropower may be solved by utilizing synergic assemblies of turbines where we may have the energy production process pass into multiple steps before finally a certain controlled flow may be advanced to production turbine, and where the net energy produced, is dependent on height and number of turbines. The alternative method shall consist of at least two turbines and pumping device per assembly.

Pump utilization of energy increases with high head pressure. Another major problem with hydroelectric power, is in low utilization times, where a PSH system is utilized to save the non-utilized power, by pumping water back to higher level reservoir to have it regain its potential power, however the main issue in the PSH method is the low efficiency, where energy is spent on overcoming high head or resistance. To save power we need to not waste more power, but instead we need to utilize higher suction torque energy that may be obtained without requiring high volume of water flow. In our method high suction torque is delivered to pump or jet from a first turbine to secure pumping capacity without need to spend more Watts, however the minimal flow allowed through first turbine will be deducted from the overall pumping volume to calculate the net pumping volume.

Connecting a pump or jet to a turbine wheel, utilizing a gear or shaft may create a hoist like levering system but with having the bigger force and bigger arm (wheel torque and diameter), situated on one side of the lever. In an ordinary hoist, such set up results in distance gain causing the hoist wire to allow utilization limited to the length of the wire. In our system water flow replaces the hoist wires and the gain in distance is actually a gain in pumping flow speed, where for every gallon falls from top to bottom of the housing to driving the wheel, we have more gallons pumped from bottom to top of the housing causing net gain in gravitational energy storage. FIG. 12

Therefore, a need exists to overcome the problems with the prior art as discussed above, and particularly for a more efficient way of providing cleaner, more abundant, more environmentally friendly and recycling alternatives for power generation, namely, hydroelectric power generation.

SUMMARY OF THE INVENTION

A method for hydrodynamic energy generation and neutralized head pressure pump assembly is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the method for hydrodynamic energy generation includes providing a housing comprising a hollow interior, pumping water via the housing using a pump located at a bottom of the housing, the pump equipped with a first fluid inlet routing fluid from a high head pressure turbine compartment, and a second fluid inlet that routes fluid from a second low head compartment. providing a first vertically aligned compartment within the housing, wherein the first vertically aligned compartment has a first opening on an upper end and a second opening on a lower end, which interfaces with the first fluid inlet, mechanically coupling a first water wheel, located below the first opening on the lower end and within the first compartment, to pump assembly. A pumping jet is moved when the first water wheel is moved by water that falls into the first compartment, providing a flow control valve at the second opening of the first compartment, providing a second vertically aligned compartment within the housing, wherein the second compartment has a first opening on an upper end and a second opening on a lower end, which interfaces with the second fluid inlet, mechanically coupling a second water wheel, proximate to the second opening of the second compartment, to a generator for generating electrical or mechanical rotational power, by the generator, when the second water wheel is moved by means of water flow which then exits the lower end of the second compartment, reading data from a controlled water level under the second turbine. providing a third vertically aligned compartment within or beside the housing, wherein the third compartment has a first opening on an upper end and a second opening on the lower end, wherein the upper end of the third compartment is in fluid communication with the first and second compartments, providing a fourth compartment within the housing arranged proximate to the lower ends of the first, second and third compartments, wherein the second openings of the first, second, and third compartments provide fluid communication with the fourth compartment, a pump or external jet for removing water from the fourth compartment into the third compartment, wherein the pump is mechanically coupled to the first water wheel through the external gear box, shaft or chain and at least partially powered by the generator or by external power source, and, conductively coupling the hydrodynamic energy generation system with the external power source via a coupling.

The foregoing and other features and advantages will be apparent from the following more particular description of the preferred embodiments, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

Figure 1:
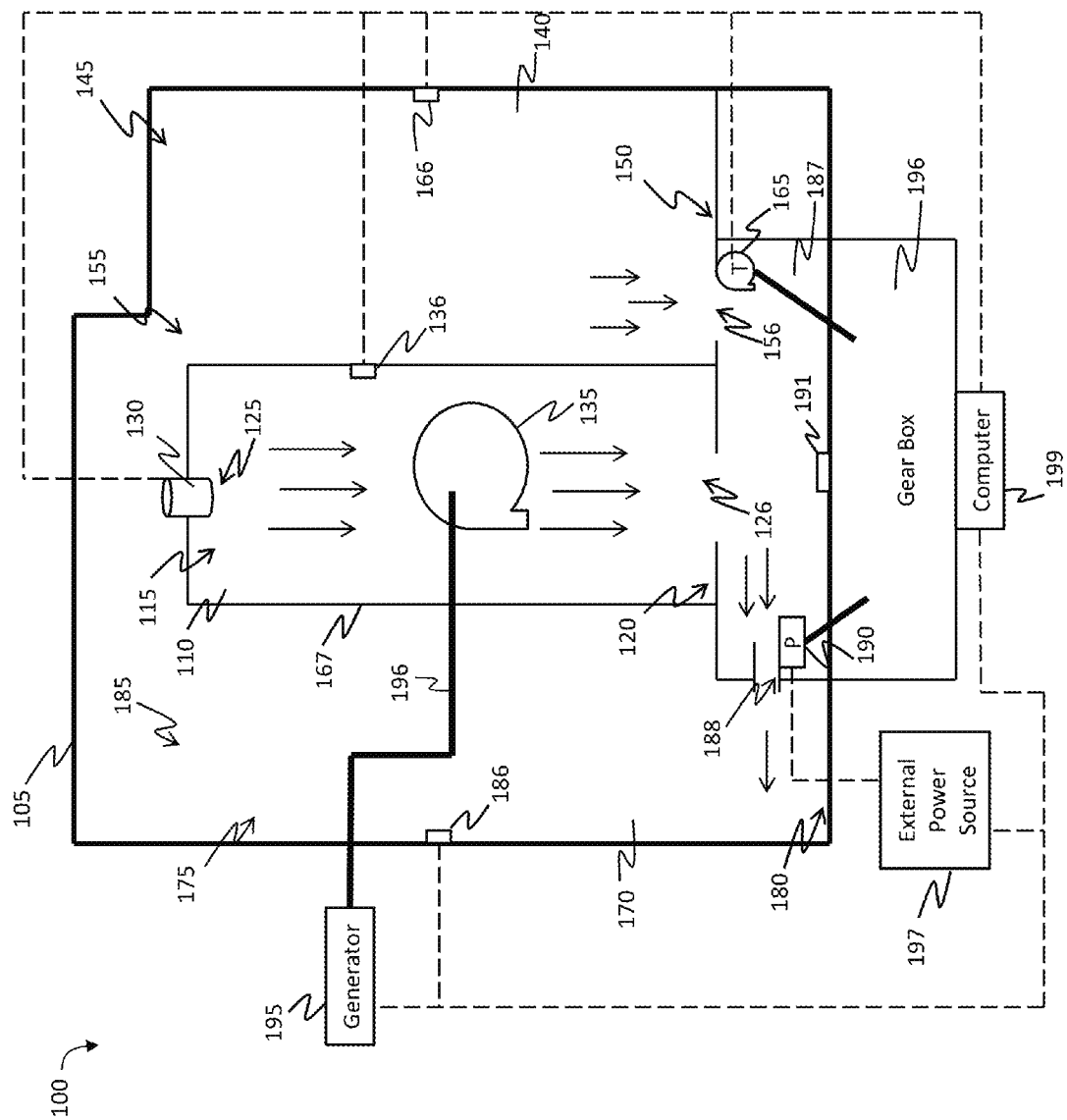
FIG. 1 is a diagram illustrating the hydrodynamic energy generation system, in accordance with one embodiment.
Figure 2:
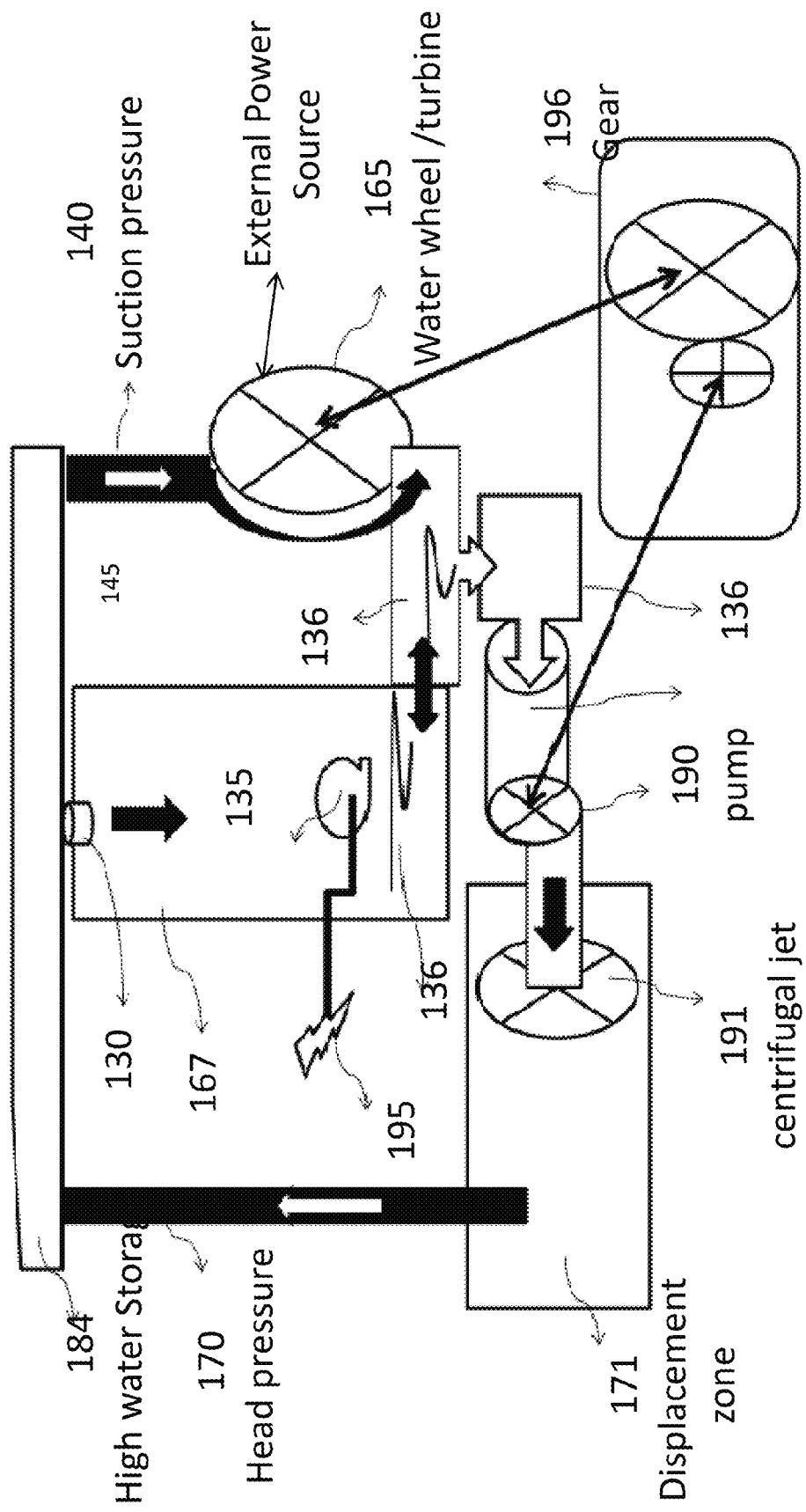
FIG. 2 is a diagram of a neutralized head pressure pump, in accordance with alternative embodiment

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

In accordance with the embodiments described herein, a neutralized pressure pump in the bottom of a hydrodynamic energy generation system is disclosed that overcomes the problems with the prior art as discussed above, by providing an energy generation system that utilizes efficient, clean, renewable energy and does not produce waste. As an improvement over conventional energy generation systems, the disclosed systems allows for the production of energy through unique utilization of potential energy of falling water that is plentiful and renewable or a recycled method, without the drawbacks of burning fossil fuels—i.e., waste products. Also, the hydrodynamic energy generation system provides a system with a minimal number of component parts, thereby reducing the potential for failure or malfunction of its combination parts. Further, the minimal number of component parts allows for quick and inexpensive fabrication of the combination parts, thereby resulting in an economical system. Lastly, the hydrodynamic energy generation system is easily maneuverable, easily transportable, inexpensive to manufacture and lightweight in its physical characteristics.

In this embodiment, high pressure forces working against pumping efforts will be utilized in a favorable direction, by circulating fluid through a second pump inlet, to drive a water wheel, which is in turn coupled through gears to driving the pump. For such utilization to be possible, we needed to have two inlets before the pump, a gear box shaft or chain that allows the coupling of the water wheel and the pump FIGS. 6 & 7. It is not the first time in history to use opposing force energy in favorable direction and the good example is the work of Herman Fottinger around 1904 who was able to benefit from the hydrodynamic energy of the water jet created behind a ship, by changing its force direction through a hydrodynamic transmission, and to apply its force to rotate the engine of the ship. In his case the water jet was already there and needed a method to apply its force, in opposite direction, to help driving the ship engine. In our case we needed to create the path of such hydrodynamic movement behind the pump, to peripherally contact and drive a water wheel, which is mechanically coupled to drive the pump.

The embodiments of the hydrodynamic energy generation method and system will be described heretofore with reference to FIGS. 1 through 12 below.

FIG. 1 is a block diagram illustrating the hydrodynamic energy generation method and system 100, in accordance with one embodiment. In one non-limiting embodiment, the method and system 100 may include a housing 105 or other vertically aligned element, comprising a hollow interior. The housing may comprise a tubular shaped body, and may, alternatively, integrate a horizontal part or different portions in a variety of sequences or configurations. In other embodiments, the housing can comprise a cube or other hollow shaped bodies. The housing can comprise material having properties capable of containing water such as aluminum, alloys, iron, glass, ceramic, plastic any combination thereof. The hydrodynamic energy generation system 100 may be fully or partially submerged in a body of water (such as an ocean, lake or river).

The housing has vertically aligned at least three compartments. However, in a submerged configuration, one or more compartments may be replaced by surrounding media of a lake or reservoir. In the present embodiment, the first vertically aligned compartment 110 (called a gravity preferred compartment) is located between the second vertically aligned compartment 140 (Called a pressure preferred compartment) and the third vertically aligned compartment 170 (called a buoyancy preferred compartment of fluid movement, where buoyancy promotion factors may be applicable to help fluid move in the upward direction).

However, this is not be a limitation and the first compartment can be positioned in other configurations. A fourth compartment 187 is located within the housing and proximate to the lower ends of the first, second, and third vertically aligned compartments and comprises in part, the feeding path of the pump. The fourth compartment may positioned be below the second compartment spanning the entire lower end of the first compartment. The fourth compartment may also be positioned such that a portion of the second and third compartments are positioned on top of the fourth compartment and a portion of the second and third compartments are positioned on the sides of the fourth compartment. However, other embodiments are within the spirit and scope of the invention.

In the present embodiment the compartments are defined by vertical and horizontal walls or structures 167 within the housing. The First vertically aligned compartment within the housing has a first opening 155 on an upper end 145 and a second opening 156 on a lower end 150 of the compartment. The second opening of the lower end of the first compartment is configured for valve controlled fluid to flow or drain from the first compartment into the fourth compartment, controlling valve may be manually or electronically adjusted and monitored. A first water wheel and/or turbine 165 is proximate to the second opening of the first compartment. The water flow through opening 156 is configured to move in a peripheral contact around the water wheel 165 and may be jet directed using an internal jet powered by external power source FIG. 11, The first waterwheel or turbine is mechanically coupled to pump through a shaft or gearbox (or reverse speed reducer) 196 that produces rotational power when the first waterwheel is moved by water exiting the lower end of the first compartment. The first water wheel and/or turbine may comprise a rotating machine that converts hydrodynamic power into mechanical power that drives a gear box 196 (further illustrated in FIG. 6 and explained below), which produces and manipulate a rotational power between the first Water wheel disk (165) and the external jet pump (190) disk. The amount of rotational torque power generated by the first turbine is proportional to the elevation of the first compartment and surface area of the first wheel pressing buckets.

The second vertically aligned compartment has an upper end 115 and an opposing lower end 120. A first opening 125 is located at the top end of the second compartment and configured to allow water to flow into the second compartment. A second opening 126 is located at the lower end of the second compartment and is configured to allow water to flow out of or exit the second compartment and flow into the fourth compartment 187. The present embodiment may further include a valve 130 coupled to the upper end of the second compartment for controlling and regulating an amount of water that enters the opening at the upper end of the second compartment through the first opening and the water level at the bottom of the second compartment in coordination with special water level sensor and also in coordination with pump flow rate. The valve 130 may comprise one or more valves for regulating flow of water, such as a ball valve, a butterfly valve, a gate valve, a globe valve, a needle valve, a spool valve or a safety valve. The valve 130 may further be a check valve or foot valve, which are unidirectional valves that only allow water to flow in one direction.

The present embodiment may also include energy production water wheel and/or turbine 135 (chained or otherwise mechanically coupled with a generator 195), wherein the water wheel 135 and/or turbine is located below the valve 125. The generator produces electrical power when the water wheel 135 and/or turbine is moved by the water entering the opening 125 and falling into the interior of the first compartment. The water wheel 135 and/or turbine may comprise a rotating machine that converts hydrodynamic power into mechanical power that drives the first generator (and/or another set of water pumps), which produces electrical power. The amount of power generated by the generator is proportional to the amount of water falling into the second compartment and is further proportional to the distance from the opening 125 to the first turbine.

The third vertically aligned compartment 170 within the housing has a first opening 185 on the upper end 175 of the third compartment and a second opening 188 at the lower end 180 of the third compartment. The upper end of the third compartment is in fluid communication with the first and second compartments such that water can flow from the first opening 185 of the third compartment into the first and second compartments via the first and second compartments' first openings 125, 155. The second opening of the lower end of the third compartment is configured for fluid to flow or be pumped from the fourth compartment into the third compartment.

The fourth compartment 187 within the housing is positioned proximate to the lower ends of the first, second and third compartments. The fourth compartment is configured such that the second openings at the lower ends of the first, second and third compartments provide fluid communication with the fourth compartment. Additionally, valves may be used at the openings of all the compartments to control the flow of fluid or water between the compartments. Such valves may comprise one or more valves for regulating flow of water, such as a ball valve, a butterfly valve, a gate valve, a globe valve, a needle valve, a spool valve or a safety valve. The valve may further be a check valve or foot valve, which are unidirectional valves that only allow water to flow in one direction.

A pump 190 or external jet for moving water from the fourth compartment 187 into the third compartments 170 is positioned proximate to the second opening of the third compartment. The pump is mechanically coupled to the shaft, chain or gear box 196 and is adapted so that it can be at least partially powered by the generator or an external power. In other embodiments additional pumps may be used, as in FIGS. 2 & 6. The pump, or any other item of the present embodiment (like first wheel, alternatively driven by external power) that may require electricity can be coupled (via a conductive coupling) and powered via an external power source. Such external power source maybe the utility power grid or another power producer, such as solar power, wind power, hydroelectric power, nuclear power, battery power etc.

The structure comprised of pump 190, the forth compartment, the first turbine (165), the low fluid head pressure opening or inlet (126) and the high fluid head pressure route opening (156) and the external gear box (reverse speed reducer) all together comprises a "neutralized pressure pump" where head pressure applied to driving first turbine is equal (or more as fluids start to acquire speed) than head pressure faces the external jet at any given elevation and as a result, the pump head pressure is alternatively calculated by head torque of pump jet or impellers wherein (head torque=pump load torque−first turbine torque output).

In the event the method and system 100 is a net consumer of energy, the system 100 has the utility identical in certain dynamics to a pumped storage hydroelectricity system. However the disclosed system is different in that, due to the installation under the surface of a body of water, or due to equal elevation of water in first and third compartments and presence water equilibrium forces, pumping water does not require more energy, when the elevation between the level of storage (or water return level) and the level of pumping is increased due to using equal or balancing values of challenging head pressure that faces the pump and of the first turbine driving torque force through, connected gear box, in driving the pump rotational energy. As is well known in the art, pumped-storage hydroelectricity is a net consumer of energy and yet has a known utility. Pumped-storage hydroelectricity (PSH) is a type of hydroelectric energy storage used by electric power systems for load balancing. The method stores energy in the form of gravitational potential energy of water, pumped from a lower elevation reservoir. Low-cost off-peak electric power is used to run the pumps. During periods of high electrical demand, turbines produce electric power. Although the losses of the pumping process make the plant a net consumer of energy overall, the system increases revenue by selling more electricity during periods of peak demand, when electricity prices are highest. This same utility may apply to system 100, however better return may be calculated.

In above ground installations of PSH systems, pumping water to higher levels of storage consumes higher energy which is wasted to overcome higher head pressure, and remains at all times energy net negative. In the disclosed system, however, while higher energy in deeper systems may be obtained from water falling through an opening, pumping a fixed amount of water out of the system consumes a similar amount of energy at different levels of depth, due to neutralizing the pressure factor in the known pumping formula, by using the gear box between the external jet pump (190) and first turbine (165). The formula in general is, (increase in pumping energy=change of head pressure*flow), and in our system, a change of head pressure is eliminated by mechanically communicating water equilibrium forces as in FIG. 9, regardless of pumping elevation. And the formula is (pumping energy=1*system constant*flow) where 1 in the formula, replaces the change of head pressure upon charges of system height, and is the ratio of head pressure in third compartment to the head pressure in first compartment, and where system constant is different according to system specs, which means both flow and pumping energy remain the same regardless of elevation, thereby giving rise to the potential that at a certain depth, the energy produced may exceed energy consumed. In the disclosed system, if the falling water produces more energy as the system is deployed in a deeper depth and when discharging this falling water consumes the same amount of energy regardless of depth, then the disclosed system may at a certain depth reach the level of being a net producer of energy. Such gain is not produced from breaking physics laws, but rather from synergic management is a system open to potential energy where by definition of thermodynamics, a system is not considered to be closed if opened to potential energy. However, the existing practice of utilizing potential power is limited to flow (where produced energy is relevant to system height and flow over a turbine), while in this system we have alternative utilization, where in the first turbine, produced torque is energy relevant to system height and bucket surface area and wheel size. Secondly, when the diameter ratio of the first turbine disk (165) and the driving disk of external jet or pump (190) is bigger than 1, then based on such ratio we may, establish secondary gain in gravitational energy storage upon gain in torque head of the pump, that may be translated into gain in pumping flow speed or volume, based on hoist levering calculation discussed here above.

The hydrodynamic energy generation method and system 100 may further be mechanically stationed and fixed steady in place, such as attaching the system to one or more concrete pads, metal constructions or any other fixed support. In one embodiment, the housing includes a filter coupled to the valves at the top of the housing, wherein the filter eliminates unwanted debris from the water flowing through the valves. It is desirable to eliminate the intake of debris and other unwanted material so as to reduce or eliminate clogs and other malfunctions.

The present embodiment may further include a first sensor 136 for detecting water flow and level as water falls into the second compartment 110 via the opening 125. The first sensor may be an accelerometer, a water flow sensor, a temperature sensor, a conductance measurement device, a barometer, a pressure sensor, etc. The present embodiment may also include a second sensor 166 for detecting an amount of water flowing into the first compartment 140. The second sensor may be an accelerometer, a water flow sensor, a temperature sensor, a conductance measurement device, a barometer, a pressure sensor, etc. The present embodiment may also include a third sensor 186 for detecting an amount of water flowing into the third compartment 170 and for detecting the level of the water in the third compartment. The third sensor may be an accelerometer, a water flow sensor, a temperature sensor, a conductance measurement device, a barometer, a pressure sensor, etc. The present embodiment may also include a fourth sensor 191 for detecting an amount of water flowing into the fourth compartment 187. The second sensor may be an accelerometer, a water flow sensor, a temperature sensor, a conductance measurement device, a barometer, a pressure sensor, etc. In FIG. 1, the first, second, third and fourth sensors may be one integrated unit or may comprise a plurality of sensors distributed throughout the system and method 100 in different locations.

The present embodiment may further include a computer or control processor 199. The processor may be communicatively coupled with valve 130, first generator 195, first water wheel or turbine 165, second water wheel or turbine 135, pump 190, and sensors 136, 166, 186, 191 as well as power source 197 and second generator or gear box 196. In one embodiment, processor 199 may be a central processing unit, microprocessor, integrated circuit, programmable device or computing device, as defined below with reference to FIG. 4. The control processor 199 is configured for reading data from the first, second, third and fourth sensors, first generator, second generator or gear box, and first and second water wheels or turbines and sending control signals to the valve and pump and second turbine, wherein the control signals are configured to activate the valve to regulate an amount of water that enters the first opening of the upper end of the first compartment, to activate the pump to move water from the fourth compartment and into the third compartment and to regulate an amount of water maintained in the first, second and third compartments.

As water moves from the fourth compartment 187 and into the third compartment 170, the water level rises in the third compartment until water flows into the first and second compartments. As water flows into the second compartment, gravity forces water to move the second water wheel, situated above controlled water level. As water flows into the first compartment, the difference of water level between second compartment and first compartment while interconnected, forces water to move to the lower end of the second compartment and into the fourth compartment thereby moving the first water wheel, by means of head pressure force, as water exits the first compartment. In the present embodiment, the first water wheel/turbine is positioned within the fourth compartment proximate to the second opening of the first compartment. However, in other embodiments, the water wheel may be positioned proximate to the second opening and within the first compartment.

Figure 3:
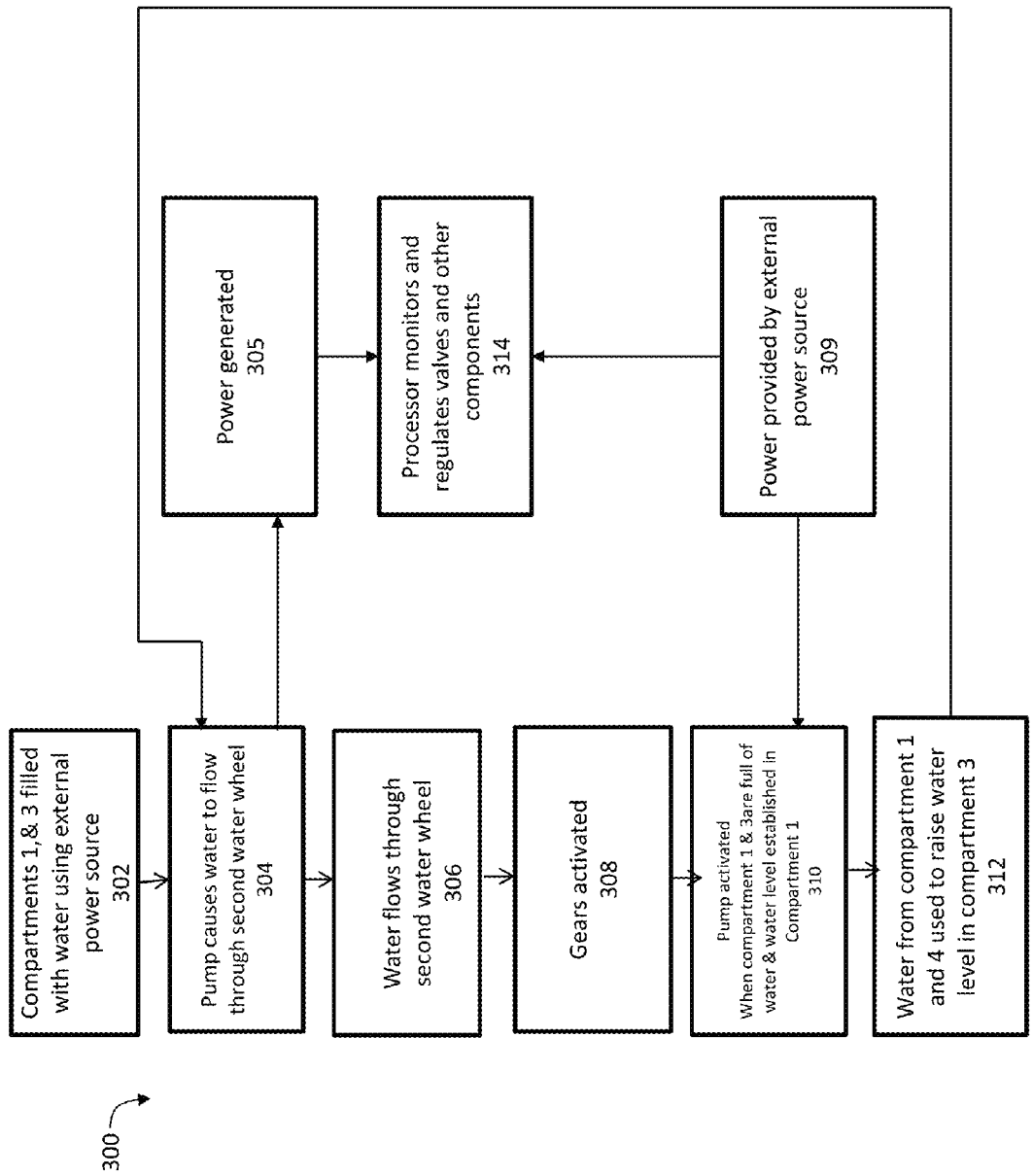
FIG. 3 is a flow chart depicting the method of the hydrodynamic energy generation system, in accordance with one embodiment.

FIG. 3 is a flow diagram illustrating the process flow 300 of the operation of the method and system 100, in accordance with one non-limiting embodiment. First, in step 302, the first, third and fourth compartments are filled with water to a certain level using an external power source. The external power source can be external power source 197. As mentioned above, the external power source can be generated from the electrical utility grid, solar power, wind power, nuclear power etc. Next, in step 304, pump 190 is activated to cause water within the fourth compartment 187 to flow into the third compartment via opening 188. As the pump moves water into the third compartment the water level rises of the third compartment rises until water flows into the first and second compartments. As water begins to fall free into the second compartment, water flows through the second turbine. As water passes through the second turbine/water wheel and into the lower end of the second compartment, the process moves to step 305 and electrical power is generated via the turbine.

As water continues to flow from the third compartment into the first compartment 140, the process moves to step 306. In step 306, as water enters into the first compartment, water flows through the first water wheel as it exits the first compartment into the fourth compartment via opening 156. Next in step 308, as water begins to flow into the fourth compartment the second water wheel or turbine 165, turns and, the gears of gearbox or generator are rotated generating mechanical power. After the gears are activated, the process moves to step 310, and the gears or generator can generate power to at least partially power the pump. In step 309, the pump can be provided power by the external power source 197 in order to partially power the pump. After the pump is activated, the process moves to step 312. In step 312, water from compartment one and two entering into compartment four can be used to continuously raise the water level of compartment three. As the water level of compartment three raises, the process moves back to step 304 and is continued until a user desires to terminate the process. Additionally, in step 314, the power generated by the generator or the power provided by the external power source and by use to power any component of the system, as well as to provide power to monitor and regulate the valves and to control the components of the system.

Figure 4:
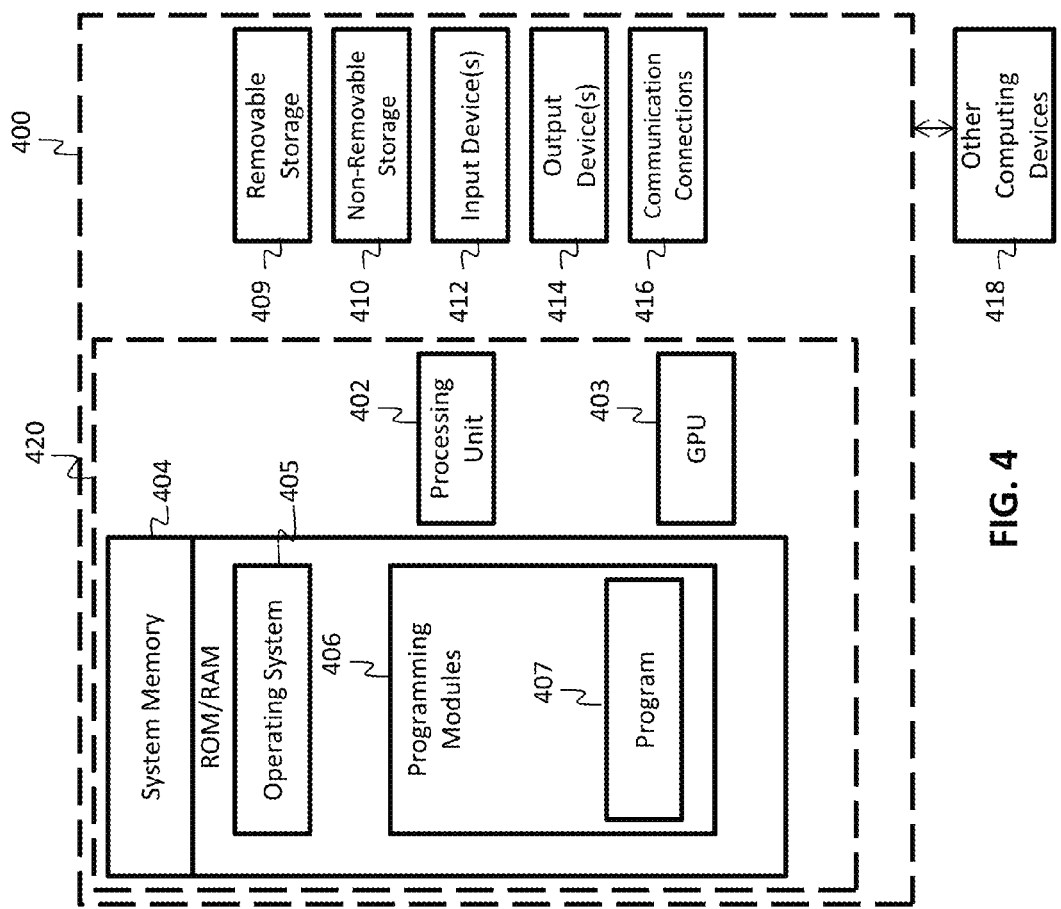
FIG. 4 is a block diagram of a system including an example computing device and other computing devices.
Figure 5:
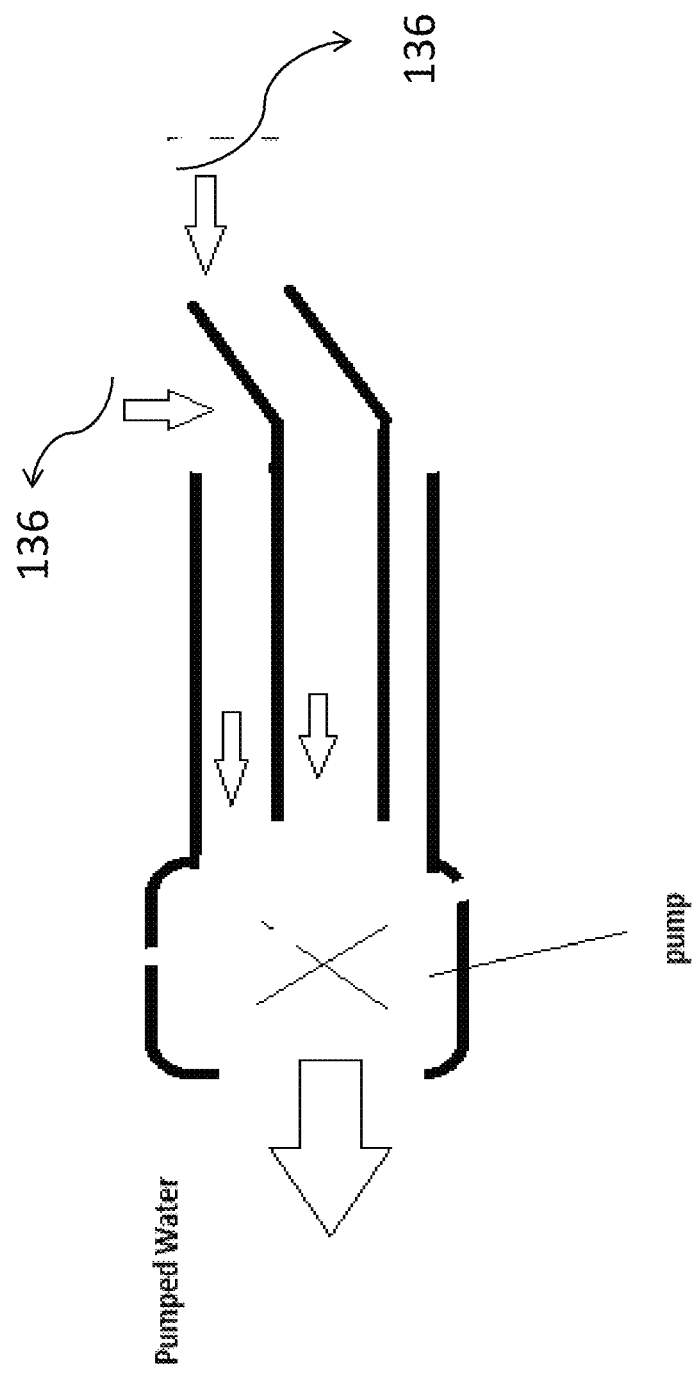
FIG. 5 is a diagram of a pressure neutral pump inlets flow, in accordance with one embodiment.

FIG. 4 is a block diagram of a system including an example computing device 400 and other computing devices. Consistent with the embodiments described herein, the aforementioned actions performed by computer 199 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for the method shown in FIG. 3 above.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, one or more programming modules 406 (such as program module 407). Operating system 405, for example, may be suitable for controlling computing device 400's operation. In one embodiment, programming modules 406 may include, for example, a program module 407. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 may perform processes including, for example, one or more of the methods shown in FIG. 3 above. Computing device 402 may also include a graphics processing unit 403, which supplements the processing capabilities of processor 402 and which may execute programming modules 406, including all or a portion of those processes and methods shown in FIG. 3 above. The aforementioned processes are examples, and processing units 402, 403 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 6:
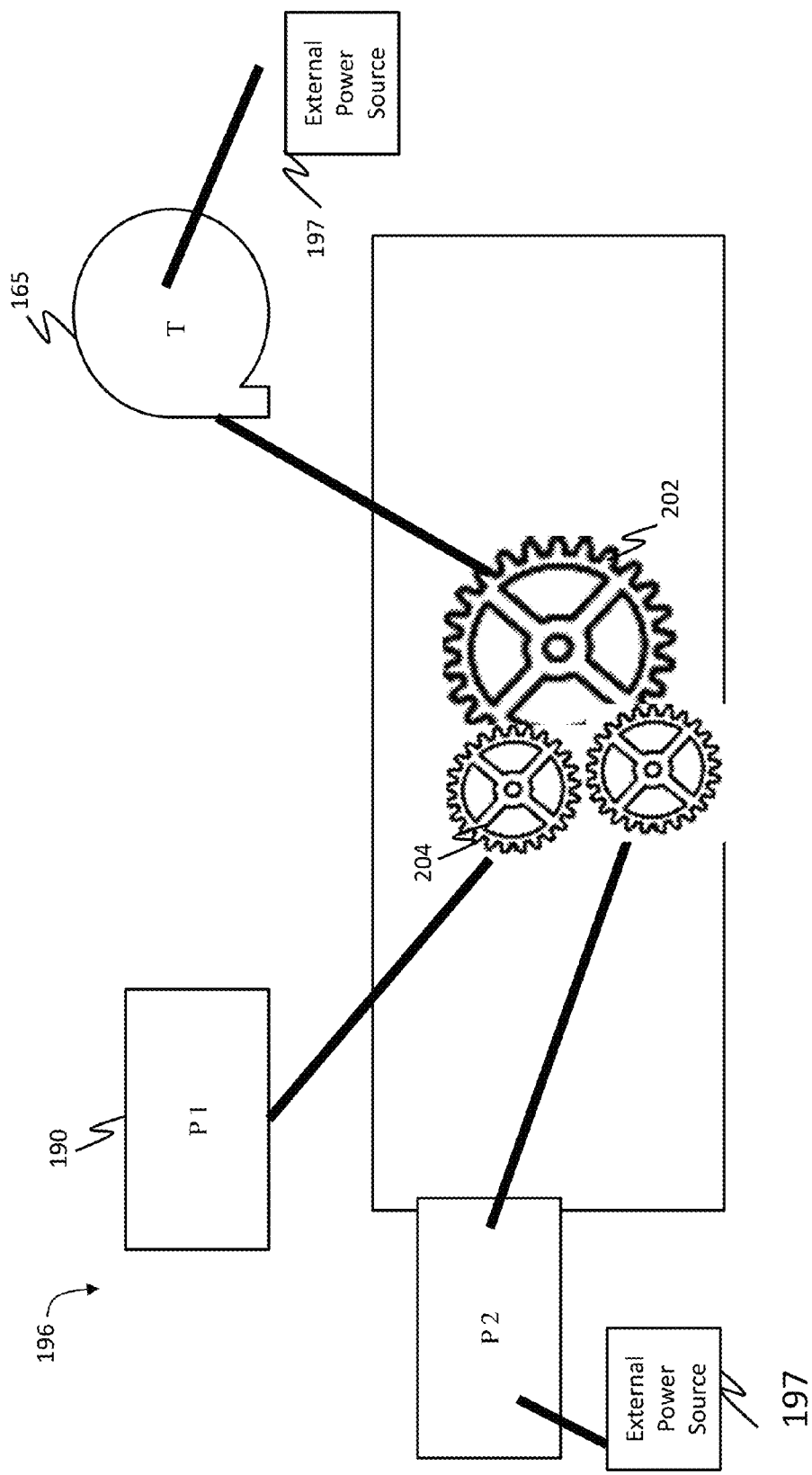
FIG. 6 is a diagram illustrating a gear system and water wheel of the hydrodynamic energy generation system, in accordance with yet another alternative embodiment.
Figure 7:
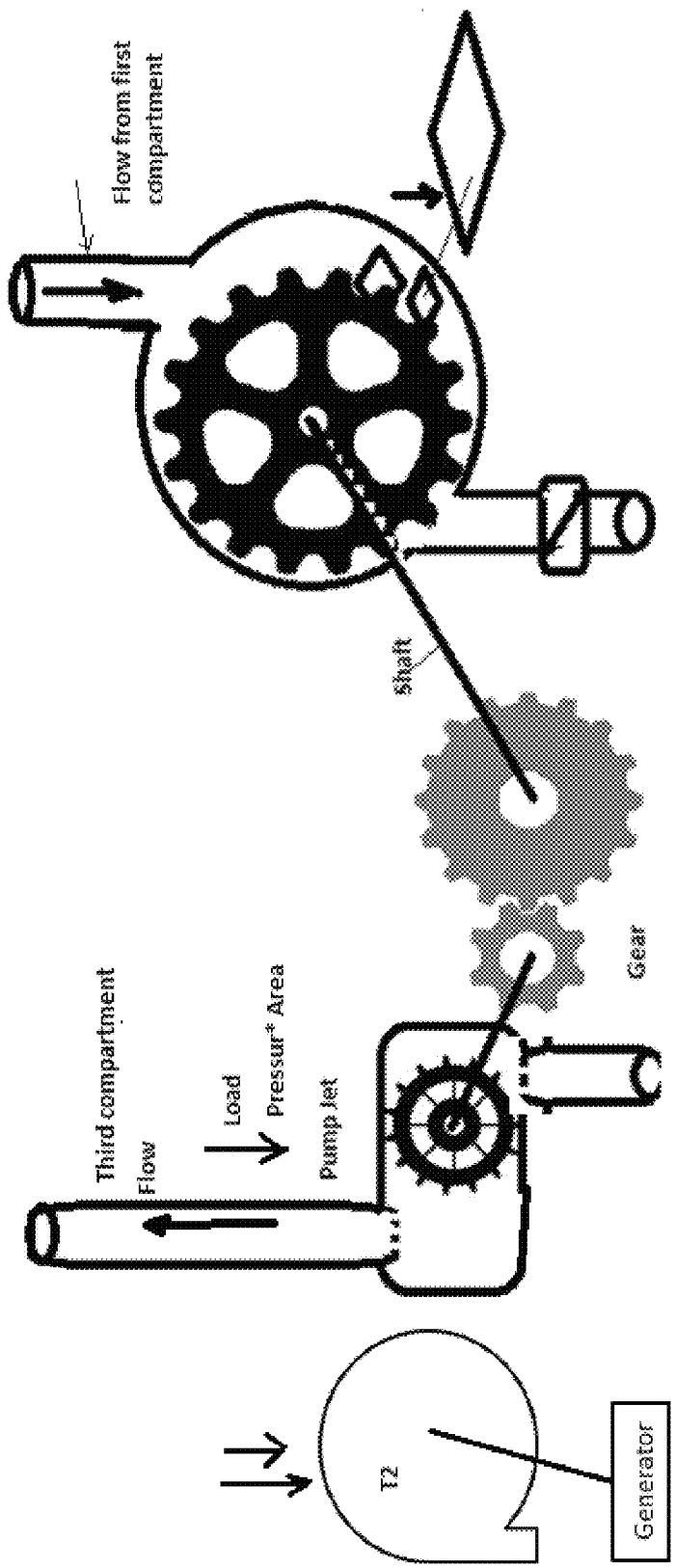
FIG. 7 is a diagram illustrating energy curve utilization of each turbine of the hydrodynamic energy generation system.

FIG. 6 is a block diagram illustrating the gear box 196 for the energy generation method and system 100, in accordance with one embodiment. The gear box may include a second housing 205 that houses gears and the gear box may be interconnected with a second generator. The first water wheel or turbine may be mechanically coupled (such as via an axle) to a first set of gears including a large gear (or disk) 202 and a small gear (or disk) 204, wherein the small gear (or disk) 204 moves at a higher rotational speed to drive pump 190. Pump 190 pumps or moves water out of the fourth compartment through opening 188 and directly to the third compartment 170. In one embodiment, various sets of gears may be chained in sequence to propagate power to other systems, pumps or sets of gears.

Figure 8:
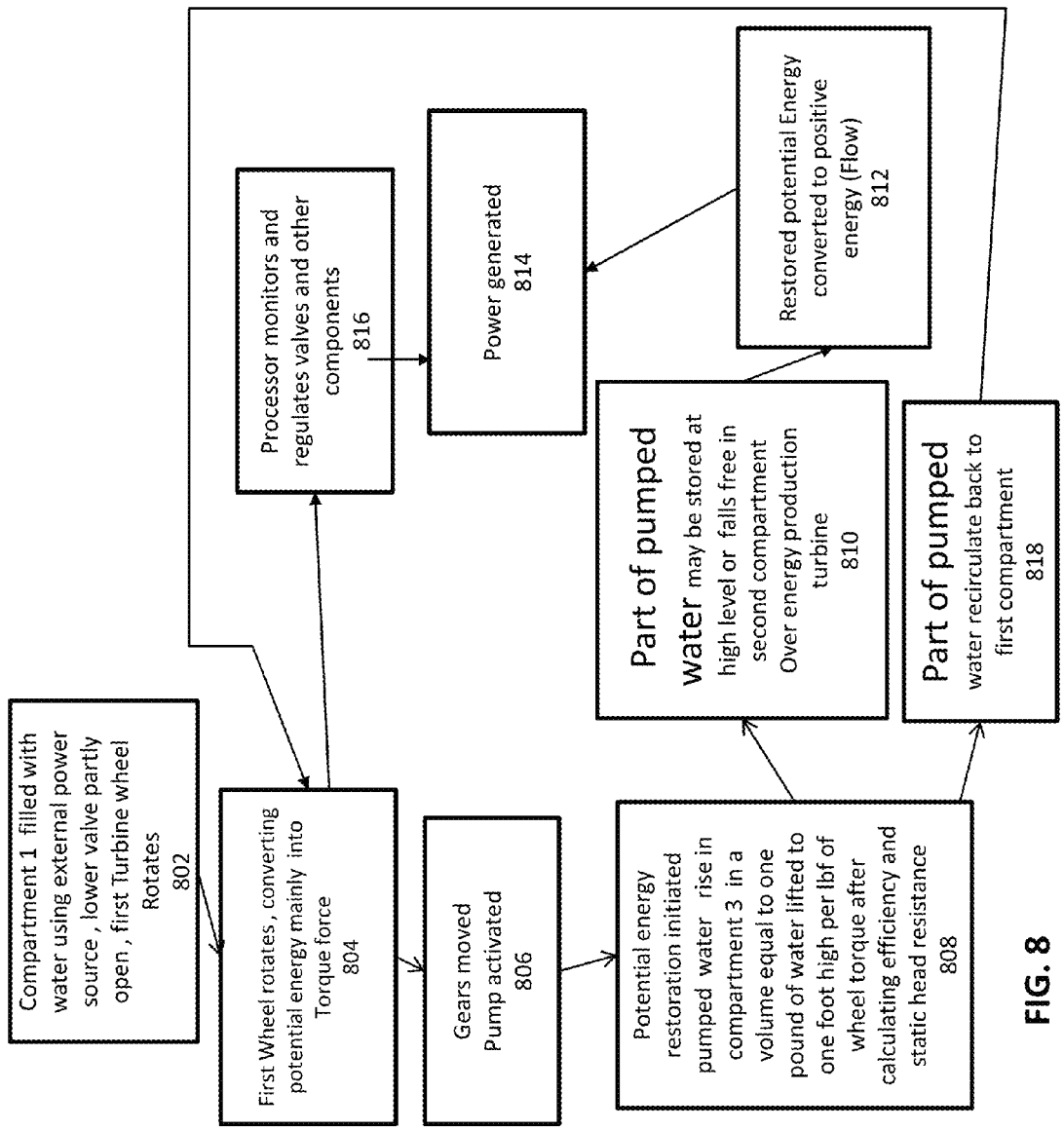
FIG. 8 is a flow chart illustrating the method of synergic management of potential energy utilization.

FIG. 8 is a flow chart illustrating synergic management and utilization of potential energy, where (negative, non-available) potential energy follows multiple steps before finally utilized as a positive energy of water flow. The method in this system starts with controlled slow flow at first compartment step 802, to convert negative potential energy into positive torque energy when first wheel is moved step 804. Then the gear is activated and the pump is moved, causing positive torque energy of first wheel to change into negative (non-available) energy of gravitational energy storage of pumped water, in step 808. Then net gained gravitational energy storage is separated by splitting pumped fluid into recirculating flow, step 818, and net gain flow, as in step 810. Then net gain of negative gravitational energy storage is converted to positive energy of flow, which causes driving the second turbine, in step 812. Then power is generated when rotating the second turbine, which moves the generator, in step 814.

Figure 9:
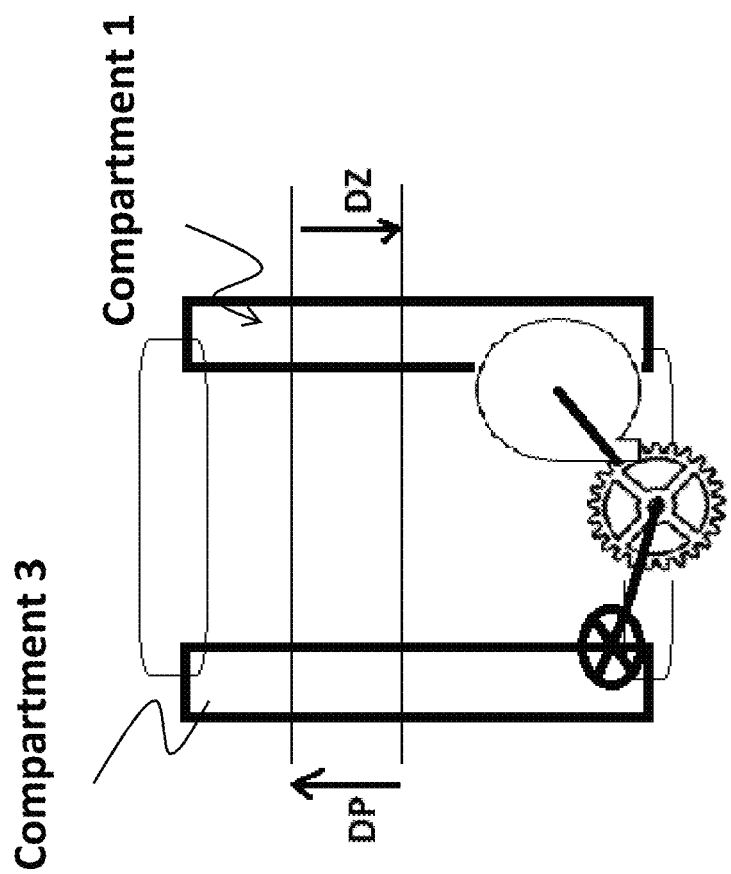
FIG. 9 is a diagram illustrating method of mechanically communicating a water equilibrium forces.

FIG. 9 is a box diagram illustrating a method of liquid equilibrium balancing but with communicating the balancing forces of the two sides of system (compartment 1 & 3) mechanically through the use of (turbine—gear-pump or jet).

Figure 10:
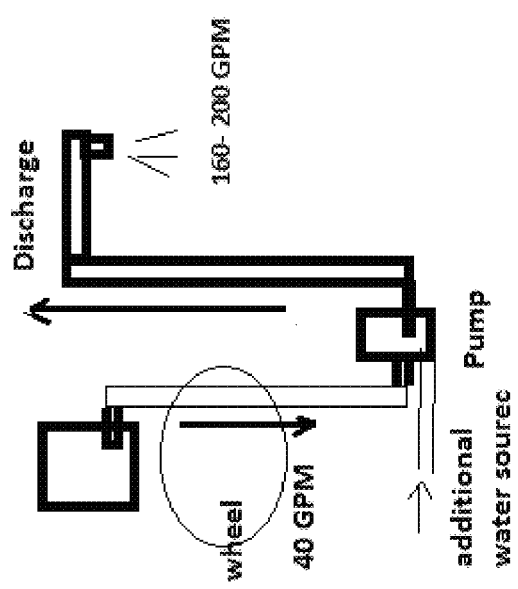
FIG. 10 is a diagram illustrating example and flow method of neutralized pressure pump.
Figure 11:
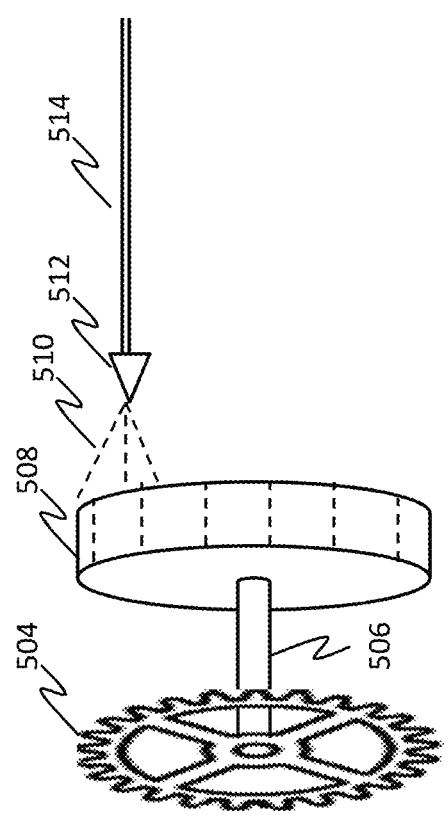
FIG. 11 is a diagram illustrating an internal jet and water wheel of the hydrodynamic energy generation system, in accordance with yet another alternative embodiment.

FIG. 10 is a diagram illustrating the model of flow in a neutralized head pressure pump and the method of utilizing and maintaining negative torque head regardless of system height (avoiding the increase in pump active head pressure in higher systems and avoiding as a result the increase in pumping energy consumption).

Figure 12:
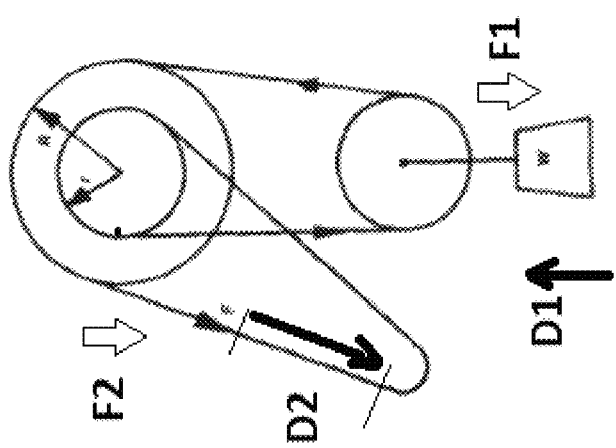
FIG. 12 is a diagram illustrating levering system example of distance gain when both big force and big arm are situated on one side of the lever. System water flow in the example resembles a chain in a pulley hoist.

FIG. 12 is pulley hoist diagram, illustrating the gain in distance (of chain movement) when both big force and big arm are situated one side and distance gain was the purpose of use rather than balancing forces. In this system, the water flow around first water wheel and around pump jet impellers, with mechanical gear connection, resemble the movement of the pulley chain. Using the numbers from above mentioned system specs, we may assert that 40 GPM of water down flow in the first compartment, may cause pumping output of about 160 GPM.

What is claimed is:

1. A method for hydrodynamic energy generation, comprising:
   providing a housing comprising a hollow interior and situated between upper and lower water reservoirs;
   pumping water via the housing using a first pump located at a bottom of the housing, the first pump equipped with a first fluid inlet providing fluid at a low head pressure and a second fluid inlet which routes fluid from a high head pressure compartment;
   providing a first vertically aligned compartment within the housing, wherein the first vertically aligned compartment has a first opening on an upper end and a second opening on a lower end, which interfaces with the first fluid inlet;
   mechanically coupling at least one water wheel, located below the first opening on the upper end and within the first compartment, to the first pump;
   causing the first pump to initiate pumping when a connected first water wheel is moved by water that falls into the first compartment;
   mechanically coupling the first water wheel, proximate to the second opening of the first compartment, to the first pump through an external gear box, shaft or chain;
   providing a second vertically aligned compartment within the housing, wherein the second compartment has a first opening on an upper end and a second opening on a lower end, which interfaces with the second fluid inlet;
   a second water wheel located in the second compartment;
   generating mechanical rotational power or electrical power by a generator, when the second water wheel is moved by means of water flow before exiting the lower end of the second compartment;
   providing a third vertically aligned compartment or tubing within or beside the housing, wherein the third compartment has a first opening on an upper end and a second opening on the lower end, wherein the upper end of the third compartment is in fluid communication with the first and second compartments;
   providing a fourth compartment within the housing arranged proximate to the lower ends of the first, second and third compartments, wherein the second openings of the first, second, and third compartments provide fluid communication with the fourth compartment;
   reading data from a controlled water level under the second water wheel;
   the first pump for removing water from the fourth compartment into the third compartment, wherein the first pump is mechanically coupled to the first water wheel through the shaft, chain or external gear box and at least partially powered by the generator, and wherein the first pump is at least partially powered by an external power source; and
   conductively coupling the hydrodynamic energy generation system with the external power source via a coupling.

2. The method for hydrodynamic energy generation of claim 1, further comprising:
   providing a set of turbines where, at least one turbine is dedicated to providing mechanical rotational power to driving pump impellers through a connecting shaft or gear box.

3. The method for hydrodynamic energy generation of claim 1, further comprising:
   providing a set of turbines, where at least one first turbine is equipped by a flow control valve, situated under the turbine.

4. The method for hydrodynamic energy generation of claim 1, further comprising:
   providing a set of turbines, where at least one turbine is mechanically connected to the generator.

5. The method for hydrodynamic energy generation of claim 1, further comprising:
providing a set of turbines, where at least one first turbine is alternatively moved by pressed steam or gas or an external power source.

6. The method for hydrodynamic energy generation of claim 1, further comprising:
providing a multi compartment housing situated below an upper water reservoir.

7. The method for hydrodynamic energy generation of claim 1, further comprising:
providing a split valve situated after the first pump.

8. The method for hydrodynamic energy generation of claim 1, further comprising:
detecting, using a first sensor, the water flow and the water level at the bottom of the second compartment.

9. The method for hydrodynamic energy generation of claim 1, further comprising:
detecting, using a second sensor, the water flow through the second compartment.

10. The method for hydrodynamic energy generation of claim 1, further comprising:
detecting, using a third sensor, an amount of water in the third compartment.

11. The method for hydrodynamic energy generation of claim 1, further comprising:
detecting, using a fourth sensor, water flow through a fourth compartment.

12. The method for hydrodynamic energy generation of claim 1, further comprising:
controlling an amount of water that enters into the first compartment through its first opening, using a valve coupled to the lower end of the first compartment.

13. The method for hydrodynamic energy generation of claim 1, further comprising:
communicatively coupling a control processor with the first pump, the first water wheel, and the generator.

14. The method for hydrodynamic energy generation of claim 13, wherein the control processor is configured for:
reading data from the first pump and the first water wheel; and
sending control signals to the first pump, and the first water wheel wherein the control signals are configured to activate the pump and turbine to regulate an amount and flow of water maintained in the first, second and third compartments.

15. The method for hydrodynamic energy generation of claim 14, further comprising:
communicatively coupling the processor to the second water wheel, wherein the processor is further configured for reading data sent from the second water wheel.

16. The method for hydrodynamic energy generation of claim 1, wherein the first water wheel is a turbine.

17. The method for hydrodynamic energy generation of claim 1, further comprising:
providing a set of turbines, where at least one of said set of turbines is an engine wheel.

18. A method of hydrodynamic energy generation, comprising:
providing an at least partially submerged housing comprising a hollow interior; situated under a water surface of a lake or reservoir;
pumping water out of the housing using a first pump located at a bottom of the housing, the first pump equipped with a first fluid inlet providing fluid at a low head pressure and a second fluid inlet which routes fluid from a high head pressure compartment or system surrounding;
providing a dedicated first vertically aligned compartment within or beside the housing;
mechanically coupling at least one water wheel, located at the bottom of the first compartment, to the first pump;
causing the first pump to initiate pumping and move when the a connected first water wheel is moved by water that moves from the first compartment through the first water wheel;
mechanically coupling the first water wheel, proximate to the bottom of the first compartment, to the first pump through an external gear box;
providing a second vertically aligned compartment within the housing, wherein the second compartment has a first opening on an upper end and a second opening on a lower end, which interfaces with the second fluid inlet;
a second water wheel located in the second compartment, generating electrical or mechanical rotational power, by a generator, when the second water wheel is moved by means of water flow before exiting the lower end of the second compartment;
providing a third vertically aligned compartment within or beside the housing;
providing a fourth compartment within the housing arranged proximate to the lower ends of the first, second and third compartments, wherein the second openings of the second compartment provides fluid communication with the fourth compartment;
reading data about a water level under the second water wheel; and
the first pump for removing water from the fourth compartment into the third compartment, wherein the first pump is mechanically coupled to the first water wheel through a shaft, chain or external gear box and at least partially powered by the generator, and wherein the first pump is at least partially powered by an external power source; and conductively coupling the hydrodynamic energy generation system with the external power source via a coupling.

19. A method for hydrodynamic energy generation, comprising:
providing a system for generating energy for a neutralized head pressure pump utility;
providing a housing comprising a hollow interior; situated between upper and lower water reservoirs;
pumping water via the housing using a first pump located at a bottom of the housing, the first pump equipped with a first fluid inlet providing fluid at a low head pressure and a second fluid inlet which routes fluid from a high head pressure compartment;
providing a first vertically aligned compartment within or beside the housing, wherein the first vertically aligned compartment has a first opening on an upper end and a second opening on a lower end, which interfaces with the first fluid inlet;
mechanically coupling at least one water wheel, located below the first opening on the lower end and within the first compartment, to the first pump;
causing the first pump to initiate pumping and move when a connected first water wheel is moved by water that falls into the first compartment;
mechanically coupling the first water wheel, proximate to the second opening of the first compartment, to the first pump through a shaft, chain or an external gear box;

providing a second vertically aligned compartment within or beside the housing, wherein the second compartment has a lower water reservoir;

an upper water reservoir above the housing, for storing excess net flow of pumped water;

providing a third vertically aligned compartment or tubing within or beside the housing, wherein the third compartment has a first opening on an upper end and a second opening on a lower end, wherein the upper end of the third compartment is in fluid communication with the first and second compartments;

providing a fourth compartment within the housing arranged proximate to the lower end of the third compartment, wherein the second openings of the first and third compartments provide fluid communication with the fourth compartment;

reading data from a controlled water level at the bottom of the second compartment;

the first pump for removing water from the fourth compartment into the third compartment, wherein the first pump is mechanically coupled to the first water wheel through the external gear box and at least partially powered by an external power source; and conductively coupling the hydrodynamic energy generation system with the external power source via a coupling.

20. The method for hydrodynamic energy generation of claim 19, further comprising:

detecting, using a first sensor, a water flow and a water level at the second compartment.

21. The method for hydrodynamic energy generation of claim 19, further comprising:

detecting, using a second sensor, a water flow through the first compartment.

22. The method for hydrodynamic energy generation of claim 19, further comprising:

controlling an amount of water that enters into the first compartment through its first opening, using a valve coupled to the lower end of the first compartment.

23. The method for hydrodynamic energy generation of claim 19, further comprising:

communicatively coupling a control processor with the first pump.

24. A method for hydrodynamic energy generation, comprising:

providing a system for generating energy for a decorative water fall pump;

providing a housing comprising a hollow interior; situated between upper and lower water reservoirs;

pumping water via the housing using a first pump located at a bottom of the housing, the first pump equipped with a first fluid inlet providing fluid at a low head pressure and a second fluid inlet which routes fluid from a high head pressure compartment;

providing a first vertically aligned compartment within or beside the housing, wherein the first vertically aligned compartment has a first opening on an upper end and a second opening on a lower end, which interfaces with the first fluid inlet;

mechanically coupling at least one water wheel, located below the first opening on the lower end and within the first compartment, to the first pump;

causing the first pump to initiate pumping and move when a connected first water wheel is moved by water that falls into the first compartment;

mechanically coupling the first water wheel, proximate to the second opening of the first compartment, to the first pump through a shaft, chain or an external gear box;

providing a second vertically aligned compartment within the housing, wherein the second compartment has a first opening on an upper end, and a second opening on a lower end, which interfaces with the second fluid inlet and a third opening through which the decorative water fall is observed;

a second water reservoir above the housing, for storing excess pumped water, where such reservoir feeds the decorative water fall into the second compartment;

providing a third vertically aligned compartment within or beside the housing, wherein the third compartment has a first opening on an upper end and a second opening on a lower end, wherein the upper end of the third compartment is in fluid communication with the first and second compartments;

providing a fourth compartment within the housing arranged proximate to the lower ends of the first, second and third compartments, wherein the second openings of the first, second, and third compartments provide fluid communication with the fourth compartment;

reading data from a controlled water level at the bottom of the second compartment;

the first pump for removing water from the fourth compartment into the third compartment, wherein the first pump is mechanically coupled to the first water wheel through the external gear box and at least partially powered by an external power source; and conductively coupling the hydrodynamic energy generation system with the external power source via a coupling.

* * * * *